Figure 1:
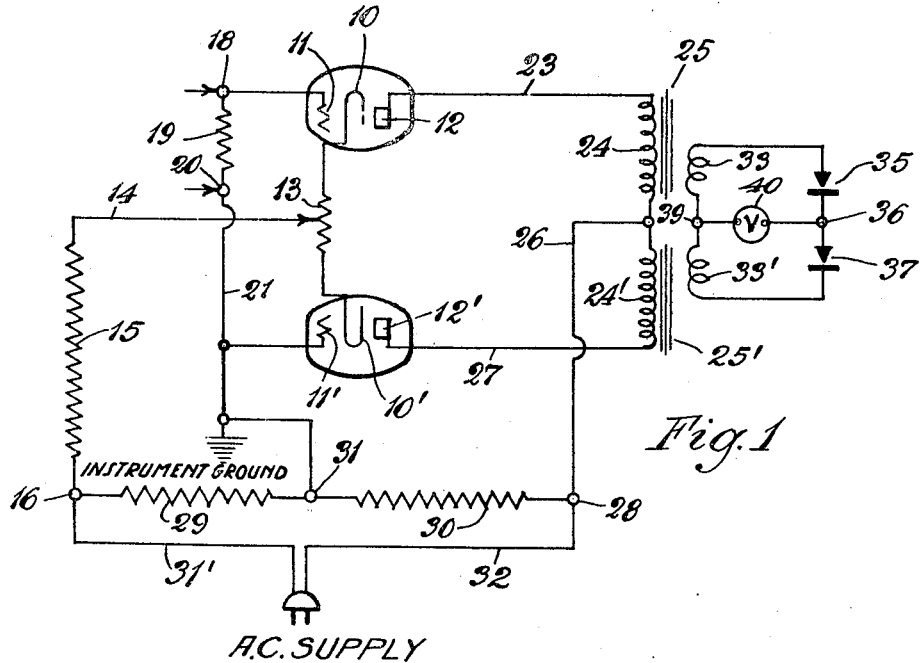

Feb. 24, 1948.    W. H. BUSSEY    2,436,741
VACUUM TUBE VOLTMETER
Filed Aug. 10, 1945

Inventor
William H. Bussey
by Robert L. Kahn
Attorney

Patented Feb. 24, 1948

2,436,741

UNITED STATES PATENT OFFICE 2,436,741

VACUUM TUBE VOLTMETER

William H. Bussey, Chicago, Ill., assignor, by mesne assignments, to Robert L. Kahn, trustee Application August 10, 1945, Serial No. 610,100

6 Claims. (Cl. 171—95)

This invention relates to an electrical apparatus and particularly to a vacuum tube type of direct current voltmeter. Such vacuum tube types of voltmeters are well known in the art. As a rule, they utilize one or two vacuum tubes and provide a bridge circuit across which some indicating means such as an ordinary moving coil type of milli-voltmeter is disposed. The bridge resistances involve the cathode to anode region in a vacuum tube as a part thereof. Thus, a bridge of this character may have a resistance across the bridge points, where the indicating means is disposed, of the order of 50,000 ohms and generally more. A moving coil milli-voltmeter or other suitable available indicating means itself at most has a resistance of the order of several hundred ohms, usually under 500. It is, thus, apparent that a serious mis-match between the voltmeter and bridge results. Because of this mis-match, a great loss of efficiency results and the sensitivity of this type of a system with normal commercial components is never fully realized.

The invention herein provides a direct current vacuum tube type of voltmeter system, particularly for the measurements of voltages, which voltmeter is susceptible to quantity manufacture, of components readily available on the market, and which will yield a sensitivity far beyond any sensitivity of present-day direct current vacuum tube voltmeters. In accordance with my invention, I provide a differential amplifier consisting of two sets of vacuum tube elements with the output going to a pair of transformers. The secondaries of the transformers have as a load rectifiers and a comparatively cheap and insensitive indicating means.

The amplifiers are preferably class A and, in their quiescent condition, are normally operated at the center of the linear portion of their characteristic curves. This general arrangement may be varied to suit special purposes and conditions. However, for ordinary voltmeter work, such an amplifier arrangement is most desirable. The amplifiers function in a dual capacity, as amplifiers and also as rectifiers.

The rectifiers in the transformer secondary circuit may be of any type desired but preferably are of the low voltage type. The transformers function as an impedance matching means between the vacuum tubes and rectifiers. By proper arrangement of the rectifiers and transformer secondaries, it is possible to obtain two points between which differences of potential do not normally exist. However, upon the presence of a potential to be measured, an unbalanced condition is set up at the amplifiers, which unbalanced condition is reflected into the transformer secondaries and rectifiers. A comparatively cheap indicating instrument such as a voltmeter disposed across the two points in the secondary circuit, is relied upon to indicate effective voltage differences arising out of the unbalance.

The rectifiers are preferably of the type and are operated in such a manner that their effective resistance is substantially of the same order as that of the indicating means. By proper matching in the transformer secondary circuit, maximum power flow in the circuit will always result and thus the system will operate at maximum efficiency.

Figure 2:
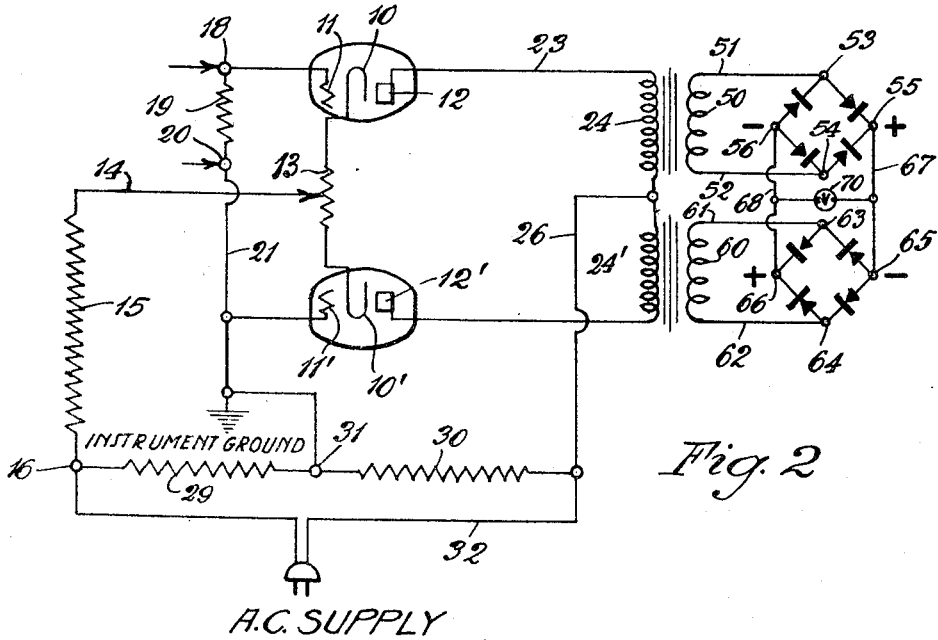

In order that the invention may be fully understood, reference will now be made to the drawing wherein Figure 1 shows a circuit diagram of a vacuum tube type of voltmeter system, and Figure 2 is a view showing a modified form of transformer secondary and rectifier circuit.

Referring to Figure 1, an amplifier has cathodes 10 and 10', grids 11 and 11' and anodes 12 and 12' respectively. Cathodes 10 and 10' may under some conditions be consolidated into one structure. Cathodes 10 and 10' are connected to the terminals of potentiometer 13, the wiper of which is connected to lead 14 going to bias resistor 15 and thence to junction 16.

Grid 11 is connected to input terminal 18, this terminal being connected through high resistance 19 to input terminal 20. Grid 11' and input terminal 20 are grounded to the instrument through lead 21.

Anode 12 is connected through lead 23 to primary 24 of transformer 25. Primary 24 has its other terminal connected to lead 26. Similarly, anode 12' is connected by lead 27 to primary 24' of transformer 25'. The other terminal of transformer primary 24' is connected to lead 26. Lead 26 is connected to junction 28.

Between junction 16 and 28 are connected resistors 29 and 30 with junction 31 of these resistors being grounded. Connected to junctions 16 and 28 are line wires 31' and 32 which may be connected to a suitable source of alternating current such as the usual 60 cycle, 110 volts.

Transformer 25 has secondary 33, while transformer 25' has corresponding secondary 33'. The outer terminal of secondary 33 is connected to rectifier 35 and thence to junction 36. The outer terminal of secondary 33' is connected by rectifier 37 to junction 36. The polarity of rectifiers 35 and 37 is such that both are in series aiding.

The inner terminals of secondary 33 and 33' are connected together to junction 39, these secondaries being in series aiding also. Across junctions 36 and 39, a suitable indicating instrument as voltmeter 40 is connected.

Transformer primaries 24 and 24' are preferably so designed that the reflected impedances match the plate impedances of their respective tubes at a frequency twice that supplied to wires 31' and 32. Transformer secondaries 33 and 33' are designed to provide a suitable step-down ratio and are connected in series. The step-down ratio would be so chosen as to provide maximum power in the rectifier circuit.

Resistance 29 and 30 may have any desired value. Thus, resistances 15 and 29 together provide grid bias for both vacuum tubes so that their total value would be determined by the tube currents and desired grid bias. Resistance 30 is a bleeder resistance functioning as part of the voltage divider.

Rectifiers 35 and 37 may be of any desired type. Thus, a cheap convenient one is the copper oxide type. Under operating conditions, the rectifier preferably has a resistance of the same order as the indicating instrument. Thus, the secondary circuit may be designed to have a voltage of the order of one volt or less, although other values may be used. The rectifiers are preferably operated at such current densities as to utilize the linear portions of their characteristic curves.

Resistance 19 across the input terminals would naturally have a high value of the order of ten megohms, though this may be varied depending upon various factors.

It is understood that means for supplying heating current to the filaments energizing cathodes 10 and 10' may be provided, and that this can be energized by line wires 31' and 32. Inasmuch as cathode energizing circuits are well known in the art, no attempt is made to show this.

Assuming that wires 31' and 32 are properly energized, it is evident that the two sets of vacuum tube elements in envelope 5 will rectify the alternating currents. Normally, with no difference in potential between terminals 18 and 20, grids 11 and 11' will be at the same potential and the two vacuum tubes will be balanced or may be balanced by adjustment of potentiometer 13. With the tubes balanced, the secondary voltages in windings 33 and 33' will be equal. There will be no difference in potential between junctions 36 and 39 so that indicating instrument 40 will show no voltage.

Now, assume that a direct potential difference exists between terminals 18 and 20. This results in a difference in potential on control grids 11 and 11' respectively and causes the two tubes to be unbalanced. The resultant tube unbalance causes unbalance in the currents in the primary windings of the transformers and also in the secondary windings. This unbalance will result in a potential difference between terminals 36 and 39.

This potential difference will be a fluctuating direct current due to the action of rectifiers 35 and 37. The polarity of this potential difference will depend upon the polarity of unbalance. It is possible to utilize indicating means such as voltmeter 40 responsive to only one polarity. This will require that the polarity between terminal 36 and 39 always have one sign. Hence, it will be necessary to connect properly the voltage to be measured to terminals 18 and 20 so that correct polarity for operating the system is maintained.

A center reading indicating instrument as a milli-voltmeter may also be used. Then tube unbalance in either direction may be indicated.

While three-element tubes are shown, it is evident that each tube may be of the type having more than three elements. Thus, tetrodes or pentodes may be used with a corresponding increase in amplification. The transformer primary winding in each case may be matched to the particular type of tube used, while the secondary may be matched to the indicating instrument and rectifier used. Thus, the two transformers are the means for providing proper matching between the tubes and indicating instrument.

In Figure 2, full wave rectifier systems are provided. Thus, secondary 50 has terminals 51 and 52 going to junctions 53 and 54 of a full wave rectifier bridge. This bridge has additional junctions 55 and 56. Rectifiers disposed in the four arms with polarities as shown will provide positive and negative outputs at junctions 55 and 56 respectively.

Similarly, secondary 60 has terminals 61 and 62 connected to junctions 63 and 64 of a full wave bridge. The remaining junctions 65 and 66 may be negative and positive respectively by disposing rectifiers polarized as indicated in the four bridge arms. Lead 67 is connected between junctions 55 and 65, while lead 68 is connected between junctions 56 and 66. Indicating means 70 is connected across leads 67 and 68.

In Figure 2, transformer secondaries 50 and 60 are in series aiding, i. e., leads 61 and 52 are of opposite polarity. The bridge rectifier systems are also in series aiding. Due to full wave rectification, instrument 70 will have a higher average current through it than instrument 40 for the same potential difference. This may be compensated for by proper calibration.

A system as described may have a high degree of sensitivity and will operate at high efficiency because of matching. It is evident that, instead of resistor 19, a voltage divider may be provided so that only a fraction of the voltage to be measured is applied to input terminals 18 and 20. Thus, large scale readings are possible.

What is claimed is:

1. A direct current vacuum tube voltmeter system comprising a differential amplifier having a high impedance input circuit to which a potential to be measured is applied and an output circuit, an alternating potential source in said output circuit, said output circuit including a pair of primary windings, secondary windings cooperating with said primary windings and having a step-down ratio, low impedance rectifiers in the circuit of said secondary windings, said secondary windings and rectifiers being connected in series aiding, said circuit having the general form of a bridge with two points of said bridge normally having no potential difference therebetween when said voltmeter system is balanced and low impedance indicating means connected across said two points, said indicating means having an impedance substantially of the same order as that of the impedance of the arms of the bridge formed by the secondary windings, said low and high impedances being of different orders.

2. A direct current vacuum tube type of voltmeter comprising a vacuum-tube type of differential amplifier having cathode, control grid and anode, connections between said tubes providing a differential amplifier with a high impedance input circuit connected to said two control grids, said vacuum tube having anode output circuits, an alternating potential source in said output circuits, a transformer having a primary in each output circuit, and a secondary for each primary, said transformer having a step-down ratio, low impedance rectifiers connected to said transformer secondaries, said secondaries and rectifiers being connected in series aiding to form a bridge having four arms, two of said arms consisting of said transformer secondaries and the remaining two arms having rectifiers therein, said bridge having two points across which normally no difference of potential exists, and a direct current low impedance indicating instrument connected between said two points, said instrument having an impedance substantially of the order of the highest arm impedance of the bridge, said low and high impedances being of different orders.

3. A direct current vacuum tube voltmeter system comprising a differential class A amplifier having a high impedance input circuit to which a potential to be measured is normally applied and having an output circuit, means for energizing said amplifier with alternating current to provide pulsating output currents, two transformers having primaries in said output circuit, said transformers providing a step-down ratio, low impedance rectifiers connected to said secondaries with said rectifiers and secondaries all in series aiding, and a direct current low impedance indicating instrument connected across two points of said secondary circuit, said two points being so disposed that the instrument completes a local circuit for each transformer primary, said two points normally having no potential difference when said voltmeter system is balanced and developing a potential difference whose polarity and amount is proportional to the unbalance of said amplifier, said low and high impedances being of different orders.

4. A direct current vacuum tube voltmeter system comprising a differential amplifier having a high impedance input circuit to which a direct potential to be measured is normally applied and having an output circuit, two step-down transformers with primaries differentially connected in said output circuit, means for energizing said amplifier with alternating current, a secondary for each transformer, a full-wave low impedance bridge type rectifying system connected across each secondary, connections between said two full-wave rectifier system outputs to dispose said outputs in series aiding and a low impedance indicating instrument connected across said connections.

5. A direct current vacuum tube voltmeter system comprising a differential amplifier having a high impedance input circuit to which a direct potential to be measured is supplied and having an output circuit including the primaries of two separate transformers connected for differential action, means for energizing said amplifier with alternating current, a secondary for each transformer, said transformers providing a step-down ratio, low impedance rectifiers connected to said secondaries so that said secondaries and rectifiers are all in series aiding, said transformer secondaries and rectifiers being adapted to operate said rectifiers along the linear portion of their characteristic curves during the normal operation of said voltmeter system and a direct current low impedance indicating instrument connected between two points, one point being symmetrically disposed with respect to said transformer secondaries and the other point being symmetrically disposed with respect to said rectifiers, said two points having no difference of potential when said system is balanced, said direct current instrument and rectifiers each having a resistance of the order of 500 ohms or less.

6. The system of claim 5 wherein said differential amplifier operates as a class A amplifier with the dynamic point of operation of the amplifier being substantially at the center of the linear portion of the characteristic curve.

WILLIAM H. BUSSEY.

REFERENCES CITED

The following references are of record in the file of this patent:

UNITED STATES PATENTS

| Number | Name | Date |
| --- | --- | --- |
| 2,153,752 | Gurtler | Apr. 11, 1939 |
| 2,240,184 | Hathaway | Apr. 29, 1941 |